US009727758B2

(12) United States Patent
Koezuka

(10) Patent No.: US 9,727,758 B2
(45) Date of Patent: Aug. 8, 2017

(54) RFID SYSTEM, COMMUNICATION DEVICE AND COMPUTER-READABLE MEDIUM

(71) Applicant: OMRON Corporation, Kyoto-shi, Kyoto (JP)

(72) Inventor: Yahiro Koezuka, Kusatsu (JP)

(73) Assignee: OMRON Corporation, Kyoto-shi (JP)

(*) Notice: Subject to any disclaimer, the term of this patent is extended or adjusted under 35 U.S.C. 154(b) by 409 days.

(21) Appl. No.: 14/088,468

(22) Filed: Nov. 25, 2013

(65) Prior Publication Data
US 2014/0285323 A1 Sep. 25, 2014

(30) Foreign Application Priority Data
Mar. 19, 2013 (JP) ................................. 2013-056221

(51) Int. Cl.
*G06K 7/00* (2006.01)
*G06K 7/10* (2006.01)

(52) U.S. Cl.
CPC ....... *G06K 7/0008* (2013.01); *G06K 7/10445* (2013.01); *G06K 7/10475* (2013.01)

(58) Field of Classification Search
CPC ........... G06K 7/10445; G06K 7/10475; G06K 19/07773; G06K 7/10099; G06K 7/10009; G06K 7/10356
USPC ................................. 340/10.1, 10.3, 13.26
See application file for complete search history.

(56) References Cited

U.S. PATENT DOCUMENTS

| 7,145,458 | B2* | 12/2006 | Hashimoto | ........ | G06K 17/0029 |
| | | | | | 235/375 |
| 2003/0216969 | A1* | 11/2003 | Bauer | .................. | G06K 7/0008 |
| | | | | | 705/22 |
| 2006/0044113 | A1* | 3/2006 | Hashimoto | .......... | G06K 7/0008 |
| | | | | | 340/10.1 |
| 2007/0080788 | A1* | 4/2007 | Manley | ................. | H04W 74/06 |
| | | | | | 340/10.33 |
| 2007/0139163 | A1* | 6/2007 | Powell | ............... | G06K 7/10356 |
| | | | | | 340/10.2 |

(Continued)

FOREIGN PATENT DOCUMENTS

| JP | 2007-036674 A | 2/2007 |
| JP | 2007-079882 A | 3/2007 |

(Continued)

*Primary Examiner* — Thomas Alunkal
(74) *Attorney, Agent, or Firm* — Mots Law, PLLC

(57) ABSTRACT

An RFID system capable of freely installing a plurality of communication devices and designing a desirable communication area, and a communication device configured to implement the system. In the RFID system, a first communication device configured to communicate with a control device includes a command receiver configured to receive a command from the control device, a first communication processing unit configured to perform communication with an IC tag in order to read/write tag information of the IC tag based on the received command, an instruction output unit configured to output a communication instruction to another communication device in response to a first communication result obtained by the first communication processing unit, and a response processing unit configured to generate response information to the control device based on the first communication result and a second communication result obtained by a second communication device.

14 Claims, 10 Drawing Sheets

(56) References Cited

U.S. PATENT DOCUMENTS

2008/0100447 A1* 5/2008 Powell ............... G06K 7/10356
340/572.2
2009/0085738 A1* 4/2009 Darianian ................ G01S 5/14
340/539.11
2010/0156601 A1* 6/2010 Lin ......................... H04L 67/12
340/10.1

FOREIGN PATENT DOCUMENTS

| JP | 2007-172419 A | 7/2007 |
|---|---|---|
| JP | 2009-188498 A | 8/2009 |

\* cited by examiner

RFID SYSTEM, COMMUNICATION DEVICE AND COMPUTER-READABLE MEDIUM

BACKGROUND

Field

The present invention relates to an RFID (Radio Frequency IDentification) system, and a communication device and a communication program which execute communication processing with an IC tag.

Related Art

In recent years, information management using an RFID tag is performed in various fields. A general RFID system includes an IC tag attached to an article to be a management target or an object (a pallet, a container or the like) for supporting or accommodating the article, a reader/writer to be a communication device configured to execute communication processing with the IC tag, and a host device configured to control the reader/writer.

Such an RFID system has technology for extending a communication area of the reader/writer.

Japanese Unexamined Patent Publication No. 2007-36674 discloses that an adapter coil (an extension antenna) is provided between a reader/writer and an IC tag (an RF tag).

Japanese Unexamined Patent Publication No. 2007-172419 discloses that a plurality of readers/writers (interrogators) performs a cooperative operation while performing radio communication utilizing the same frequency as a communication frequency with an IC tag.

Japanese Unexamined Patent Publication No. 2009-188498 discloses that a plurality of antennas is cascade-connected to a single reader/writer.

Japanese Unexamined Patent Publication No. 2007-79882 discloses that a plurality of readers/writers is arranged/connected so as to cause communication areas to partially overlap with each other in a daisy chain manner, and communication processing is executed during sequential transfer of a result of communication with a tag to the reader/writer connected adjacently.

Referring to the technology disclosed in the Japanese Unexamined Patent Publication Nos. 2007-36674 and 2009-188498, a communication distance is reduced even if a communication area is extended.

Referring to the technology disclosed in the Japanese Unexamined Patent Publication No. 2007-172419, moreover, there is a possibility that a radio wave to be used in communication between the readers/writers might badly influence the communication with the IC tag. In order to avoid the bad influence, it is necessary to perform complicated control. The greater the number of the readers/writers, the control is more complicated. Since the communication between the readers/writers is performed by wireless, furthermore, an installation distance between the readers/writers is limited.

Referring to the technology disclosed in the Japanese Unexamined Patent Publication No. 2007-79882, it is necessary to install the readers/writers in such a manner that parts of the communication areas overlap with each other. Therefore, a degree of freedom of an installation position is low. In addition, the radio wave is invisible. For this reason, it is impossible to confirm an overlapping state of the communication areas.

SUMMARY

The present invention has been devised to solve the problems described above, and an object thereof is to provide an RFID system which can be freely provided with a plurality of communication devices and can design a desirable communication area, and a communication device and a communication program which implement the system.

In accordance with one aspect of the present invention, a communication device configured to perform non-contact communication with an IC tag, the communication device including: a command receiver configured to receive a command from a control device configured to totally control reading/writing of information from/to the IC tag, a first communication processing unit configured to perform communication with the IC tag in order to read/write tag information of the IC tag based on the command received by the command receiver, an instruction output unit configured to output a communication instruction to another communication device in response to a first communication result obtained by the first communication processing unit, and a response processing unit configured to generate response information to the control device based on the first communication result and a second communication result in said another communication device responsive to the communication instruction.

Preferably, said another communication device includes a second communication processing unit configured to perform communication with the IC tag in order to read/write the tag information of the IC tag based on the communication instruction, and a result returning unit configured to return, as the second communication result, a processing result obtained by the second communication processing unit, the communication device further includes a result receiver configured to receive the second communication result from the result returning unit.

Preferably, the instruction output unit outputs the communication instruction in a case where the reading/writing of the tag information through the first communication processing unit fails, and the response processing unit generates the response information based on only the first communication result in a case where the reading/writing of the tag information through the first communication processing unit is completed within a predetermined time.

Preferably, the response processing unit generates the response information based on only the second communication result in a case where the reading/writing of the tag information through the second communication processing unit succeeds.

Preferably, the first communication processing unit reads/writes information in a first segment of the tag information, the instruction output unit outputs the communication instruction to said another communication device so as to read/write information in a second segment of the tag information. In this case, the response processing unit merges the information in the first segment and the information in the second segment to generate the response information.

Preferably, the first communication processing unit and the second communication processing unit execute detection processing for detecting presence of the IC tag, and in a case where the presence of the IC tag is detected, the first communication processing unit and the second communication processing unit read/write the information in the first segment and the information in the second segment, respectively.

Preferably, the instruction output unit outputs the communication instruction to said another communication device in a case where the information in the first segment is read/written by the first communication processing unit.

Preferably, said another communication device includes a plurality of slave devices each including the second communication processing unit and the result returning unit, and the instruction output unit outputs the communication instruction to at least one of the plurality of slave devices in response to the first communication result obtained by the first communication processing unit.

Preferably, the communication device further includes a storage unit configured to store IP addresses and installation position information of the plurality of slave devices, and the instruction output unit outputs the communication instruction to each of the slave devices specified by the IP addresses and the installation position information.

Preferably, the communication device is connected to the control device and each of the plurality of slave devices through a line concentrator and communicates with the control device and the plurality of slave devices via the line concentrator.

Preferably, the communication device further includes a setting unit configured to set an operation mode, and the operation mode has a first mode for functioning as the communication device and a second mode for functioning as said another communication device, and the communication device is operated based on the operation mode set to the setting unit.

An RFID system in accordance with another aspect of the present invention includes an IC tag, a control device configured to totally control reading/writing of information from/to the IC tag, and first and second communication devices connected to the control device and configured to perform non-contact communication with the IC tag. The control device includes a transmitter/receiver configured to transmit a command to the first communication device. The first communication device includes a command receiver configured to receive the command from the control device, a first communication processing unit configured to perform communication with the IC tag in order to read/write tag information of the IC tag based on the command received by the command receiver, an instruction output unit configured to output a communication instruction to the second communication device in response to a first communication result obtained by the first communication processing unit, and a response processing unit configured to generate response information to the control device based on the first communication result and a second communication result in the second communication device responsive to the communication instruction. The transmitter/receiver of the control device receives the response information generated by the response processing unit.

In accordance with still another aspect of the present invention, a communication program configured to perform non-contact communication with an IC tag and to cause a computer to execute the steps of: receiving a command from a control device configured to totally control reading/writing of information from/to the IC tag, performing communication with the IC tag in order to read/write tag information of the IC tag based on the received command, outputting a communication instruction to another communication device in response to a first communication result obtained by the communicating step, and generating response information to the control device based on the first communication result and a second communication result in said another communication device relative to the communication instruction.

According to the RFID system in accordance with the present invention, the communication processing with the IC tag is executed in at least the first communication device and the second communication device, respectively. Therefore, it is possible to extend the communication area with the IC tag. Moreover, the communication with the control device and the control of the second communication device are executed in the first communication device. Consequently, a user can freely install the second communication device, thereby designing a desirable communication area.

According to the communication device serving as the first communication device, furthermore, it is possible to implement the system.

DETAILED DESCRIPTION

Figure 1:
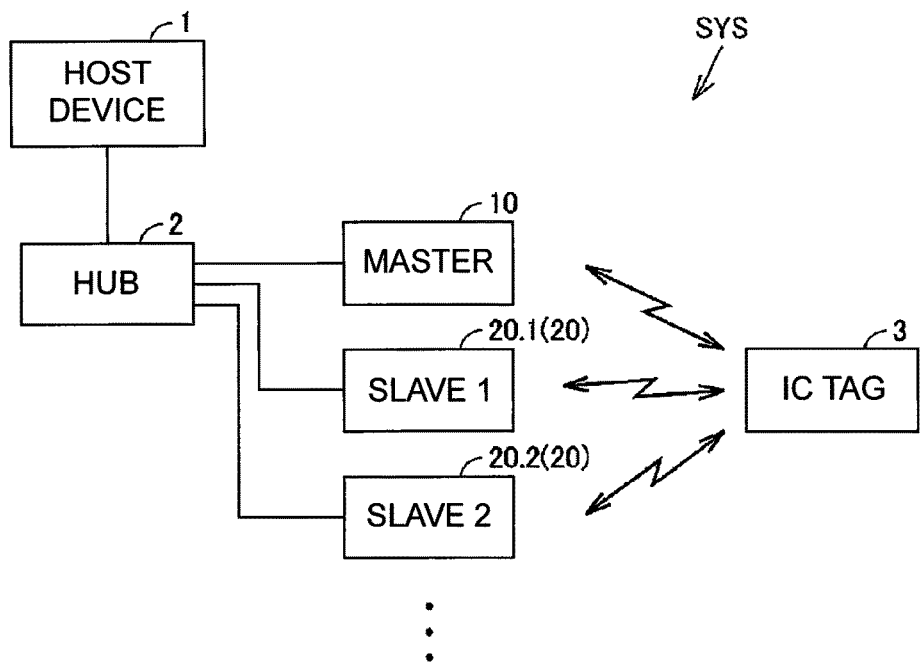
FIG. 1 is a diagram showing a schematic structure of an RFID system according to a first embodiment of the present invention.

Embodiments according to the present invention will be described in detail with reference to the drawings. The same or corresponding portions in the drawings have the same reference numerals and description thereof will not be repeated.

<First Embodiment>

An RFID system according to the present embodiment is used for managing information about a workpiece conveyed over a conveyance path in a production line of a factory, for example.

In general, although an IC tag is attached to a workpiece to be a management target or a pallet, a container or the like which supports or accommodates the workpiece, a position thereof varies in some cases. Moreover, the pallet or the container is rotated so that the position of the IC tag is changed over the conveyance path in some cases. In these cases, in a general RFID system, there is a possibility that the IC tag might be placed in a position other than a communication area of the reader/writer and information in the IC tag cannot be read/written.

On the other hand, in the RFID system according to the present embodiment, even if the position of the IC tag varies or is changed, it is possible to reliably read/write the information in the IC tag. A structure and an operation of the system will be described below in detail. The "read/write" indicates one of an operation for reading information from the IC tag and an operation for writing information to the IC tag, or both of the operations.

(Regarding Structure)

First of all, a schematic structure of the RFID system according to the present embodiment will be described.

FIG. 1 is a diagram showing a schematic structure of an RFID system SYS according to the first embodiment of the present invention.

With reference to FIG. 1, the RFID system SYS includes a host device 1 serving as a control device, a master reader/writer (hereinafter referred to as a "master") 10 and a slave reader/writer (hereinafter referred to as a "slave") 20 which serve as a plurality of communication devices, a hub 2 serving as a line concentrator, and an IC tag 3. Although it is assumed that the slave 20 includes two slaves 20.1 and 20.2 in the present embodiment, the number of the slave 20 may be one, or three or more. In the following description, in the case where the slaves 20.1 and 20.2 do not need to be distinguished, they will be collectively referred to as the "slave 20".

The host device 1 totally controls reading/writing of information from/to the IC tag 3. The host device 1 is implemented by a personal computer or a PLC (Programmable Logic Controller), for example. The host device 1 is connected to the master 10 and the salves 20.1 and 20.2 through the hub 2, and performs communication with only the master 10. The hub 2 is an Ethernet (registered trademark) hub, for example.

The master 10 and the slaves 20.1 and 20.2 execute the reading/writing of information from/to the IC tag 3. The master 10 performs the communication processing with the IC tag 3 and controls the slaves 20.1 and 20.2 in accordance with a command sent from the host device 1. The slaves 20.1 and 20.2 execute communication processing with the IC tag 3 in accordance with a command (a communication instruction) sent from the master 10.

Description will now be given of an example of installation of the master 10 and the slaves 20.1 and 20.2.

Figure 2:
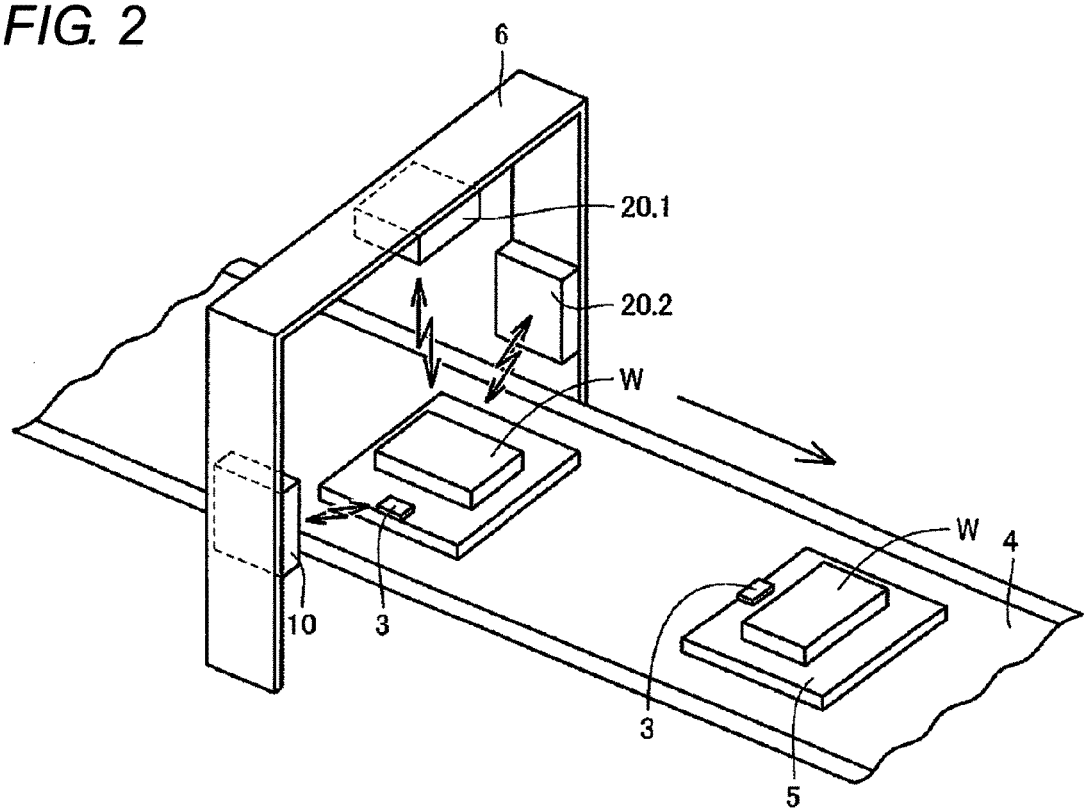
FIG. 2 is a view showing an example of installation of a plurality of readers/writers according to the first embodiment of the present invention.

FIG. 2 is a view showing an example of installation of a plurality of readers/writers according to the first embodiment of the present invention. In FIG. 2, a cable for connecting the master 10 and the slaves 20.1 and 20.2 to the hub 2 is not shown for simplicity.

With reference to FIG. 2, it is assumed that a pallet 5 having a workpiece W to be a processing target put thereon is conveyed over a conveyance path 4 in the present embodiment. The IC tag 3 is stuck onto the pallet 5. Information about the workpiece W is written to the IC tag 3. A gate 6 is disposed across an upper space of the conveyance path 4. In the gate 6, the master 10 and the slaves 20.1 and 20.2 are provided on central, left and right parts apart from each other. Positions in which the master 10 and the slaves 20.1 and 20.2 are disposed are not particularly restricted.

Next, description will be given of an example of hardware configurations of the respective readers/writers, that is, the master 10 and the slave 20.

Figure 3:
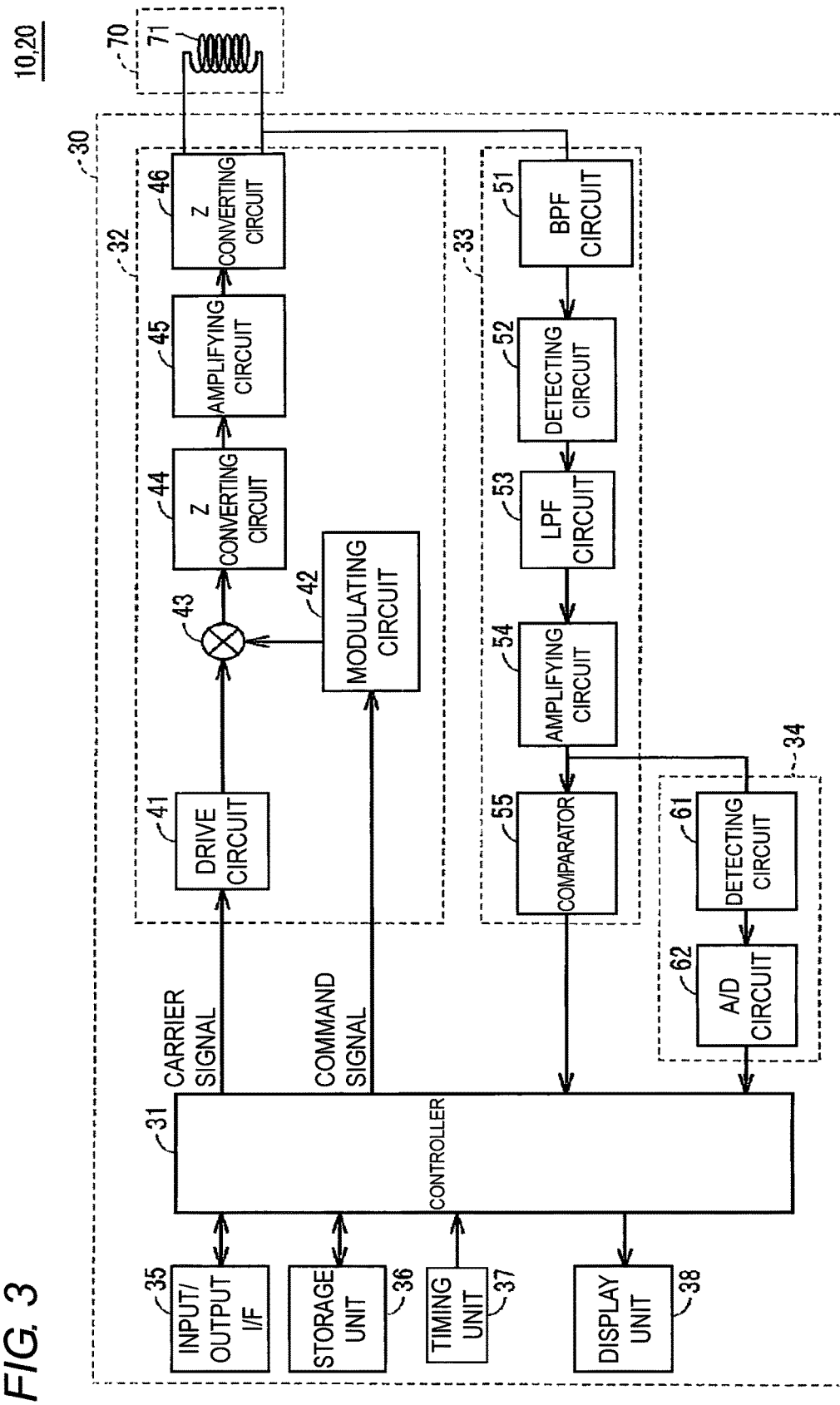
FIG. 3 is a block diagram showing a hardware configuration of each of the readers/writers according to the first embodiment of the present invention.

FIG. 3 is a block diagram showing the hardware configuration of each of the readers/writers according to the first embodiment of the present invention.

With reference to FIG. 3, the respective readers/writers (the master 10 and the slave 20) are constituted by an antenna unit 70 including an antenna coil 71 and a communication control device 30 provided with a controller 31. However, this structure is only illustrative and the antenna portion 70 and the communication control device 30 may be integrated with each other.

The communication control device 30 includes a transmitting circuit 32, a receiving circuit 33, a receiving level detecting circuit 34, an input/output I/F (interface) 35, a storage unit 36, a timing unit 37, and a display unit 38 in addition to the controller 31.

The controller 31 is implemented by an arithmetic processing unit such as a CPU (Central Processing Unit). The Ethernet (registered trademark) cable is connected to the input/output I/F (interface) 35 to input/output information together with another device. The storage unit 36 stores various programs and data. It is assumed that the storage unit 36 of the master 10 stores IP addresses of the slaves 20.1 and 20.2. The timing unit 37 performs a timing operation to output timing data to the controller 31. The display unit 38 displays various information in accordance with an instruction sent from the controller 31.

The transmitting circuit 32 is constituted by a drive circuit 41, a modulating circuit 42, a multiplying circuit 43, an amplifying circuit 45, a pair of Z converting circuits 44 and 46 interposing the amplifying circuit 45 therebetween, and the like. The receiving circuit 33 is constituted by a band-pass filter (BPF) circuit 51, a detecting circuit 52, a low-pass filter (LPF) circuit 53, an amplifying circuit 54, a comparator 55 and the like. The receiving level detecting circuit 34 is constituted by a detecting circuit 61 and an ND (Analog to Digital) converting circuit 62.

It is assumed that the communication control device 30 includes an oscillating circuit (not shown) configured to output a radio frequency pulse serving as a carrier signal.

With the structure, the controller 31 outputs a radio frequency pulse (hereinafter referred to as a "carrier signal") to be an origin of a carrier based on a pulse signal sent from an oscillating circuit (not shown). Moreover, the controller 31 properly outputs a command signal having a predetermined number of bits. The carrier signal is converted into a carrier by the drive circuit 41, is then supplied to the antenna coil 71 via impedance matching processing to be executed by the Z converting circuits 44 and 46 and amplification processing to be executed by the amplifying circuit 45, and an electromagnetic wave is thus transmitted. Moreover, the modulating circuit 42 and the multiplying circuit 43 amplitude modulate the carrier based on the command signal so that the command signal is superposed on the carrier.

When the electromagnetic wave is transmitted from the antenna coil 71 by the processing described above, induced electromotive force is generated over the IC tag 3 in the communication area by the electromagnetic wave so that a controller (not shown) on the IC tag 3 side is activated. When the command signal is transmitted from the antenna coil 71 in this condition, the controller on the IC tag 3 side decodes a command represented by the command signal and executes designated processing, and then generates a signal (a response signal) representing predetermined response data and returns the signal to the reader/writer (the master 10 or the like).

In the receiving circuit 33, a noise is removed by the band-pass filter circuit 51 and a carrier including a response signal is then extracted by the detecting circuit 52. Furthermore, the response signal of the IC tag 3 is extracted from the carrier by the low-pass filter circuit 53 and is amplified by the amplifying circuit 54, and is then converted into a rectangular signal by the comparator 55. The controller 31 decodes response contents of the IC tag 3 by using a signal input from the comparator 55 and outputs communication result data including the decoded data to the input/output I/F 35.

The detecting circuit 61 of the receiving level detecting circuit 34 receives the same input of the response signal as the input to the comparator 55, thereby generating an envelope signal representing a level change of each peak of the response signal. The A/D conversion circuit 62 digitally converts the envelope signal. The controller 31 inputs digital data generated by the conversion as a receiving level of the response signal.

Next, description will be given of an example of functional structures of the respective readers/writers, that is, the master 10 and the slave 20.

Figure 4:
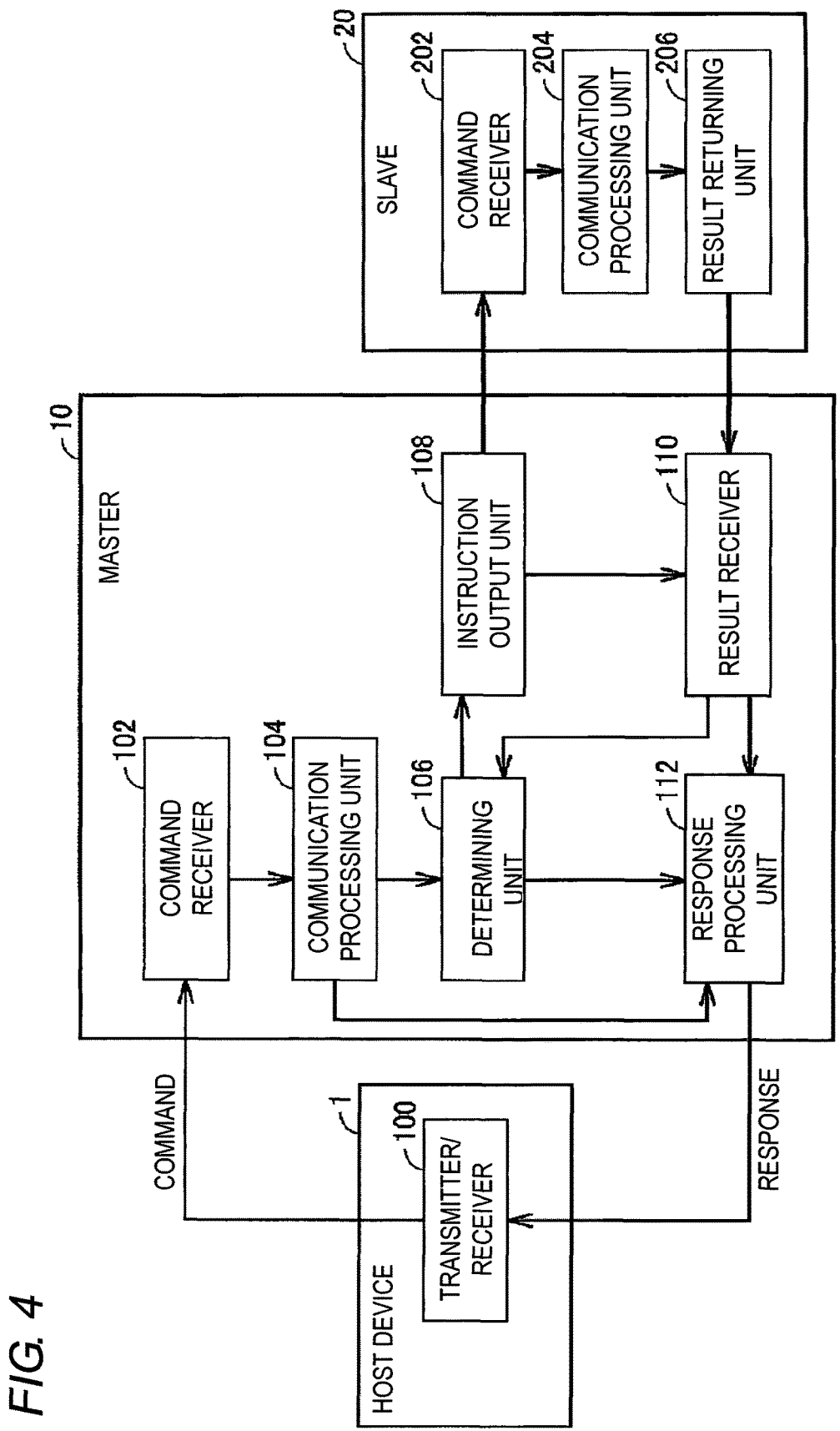
FIG. 4 is a functional block diagram showing respective functional structures of a master and a slave according to the first embodiment of the present invention.

FIG. 4 is a functional block diagram showing the respective functional structures of the master 10 and the slave 20 according to the first embodiment of the present invention. For easy understanding, description will be given on the assumption that the master 10 controls only one slave 20.

With reference to FIG. 4, the host device 1 includes a transmitter/receiver 100. The transmitter/receiver 100 is an input/output I/F for transmitting/receiving information to/from only the master 10 in the plurality of readers/writers. In other words, the transmitter/receiver 100 transmits a command to the master 10 and receives a response from the master 10.

The master 10 includes, as a functional structure thereof, a command receiver 102, a communication processing unit 104, a determining unit 106, an instruction output unit 108, a result receiver 110, and a response processing unit 112. The command receiver 102 receives the command transmitted from the transmitter/receiver 100 of the host device 1. The communication processing unit 104 executes communication processing with the IC tag 3 based on the received command. A processing result (hereinafter referred to as a "communication result") obtained in the communication processing unit 104 is output to the determining unit 106. The determining unit 106 determines whether or not the communication processing is normally ended based on the input communication result.

The instruction output unit 108 executes processing for outputting the communication instruction with the IC tag 3 as a command to the slave 20 depending on a result of the determination made by the determining unit 106. In the present embodiment, if it is determined that the communication processing is not normally ended (failure) by the determining unit 106, a communication instruction is output to the slave 20. The result receiver 110 receives the communication result from the slave 20 and outputs the communication result to the determining unit 106. Consequently, it is also determined whether the communication result obtained in the slave 20 is normally ended or not.

The response processing unit 112 generates response information to the host device 1 based on the communication results obtained from the communication processing unit 104 and the result receiver 110. In the present embodiment, if the communication result obtained from the communication processing unit 104 is normal end (success), tag information read/written by the master 10 is returned as a response. If the communication result in the communication processing unit 104 is abnormal end and the communication result in the slave 20 which is received by the result receiver 110 is normal end, tag information read/written by the slave 20 is returned as a response. On the other hand, if all of the communication results are the abnormal end, information indicative of the abnormal end is returned as a response. Response information generated in the response processing unit 112 is transmitted to the transmitter/receiver 100 of the host device 1 through the input/output I/F 35 shown in FIG. 3. Consequently, the host device 1 performs predetermined control based on the received response information.

The slave 20 includes a command receiver 202, a communication processing unit 204, and a result returning unit 206 as a functional structure thereof. The command receiver 202 receives a command transmitted from the instruction output unit 108 of the master 10. The communication processing unit 204 executes communication processing with the IC tag 3 based on the received command. The result returning unit 206 returns a communication result in the communication processing unit 204 to the master 10.

In the present embodiment, thus, the communication processing of the slave 20 is controlled by the master 10.

The functions of the communication processing unit 104, the determining unit 106, and the response processing unit 112 in a plurality of functional blocks in the master 10 may be typically implemented by causing the controller 31 of the master 10 to execute a program stored in the storage unit 36. The functions of the command receiver 102, the instruction output unit 108, and the result receiver 110 may be typically implemented by the input/output I/F 35 of the master 10.

Moreover, the communication processing unit 204 in a plurality of functional blocks in the slave 20 may be typically implemented by causing the controller 31 of the slave 20 to execute the program stored in the storage unit 36. The functions of the command receiver 202 and the result returning unit 206 may be typically implemented by the input/output I/F 35 of the slave 20.

(Regarding Operation)

Next, an operation of the RFID system SYS according to the present embodiment will be specifically described. In the description of the operation, for easy understanding, it is assumed that only the reading of the tag information is executed as the reading/writing of the tag information by each communication device. Also in the case where only the writing of the tag information is executed or the case where both the reading and the writing of the tag information are executed, however, the processing can be executed in accordance with the same procedure as a processing procedure which will be described below.

Figure 5:
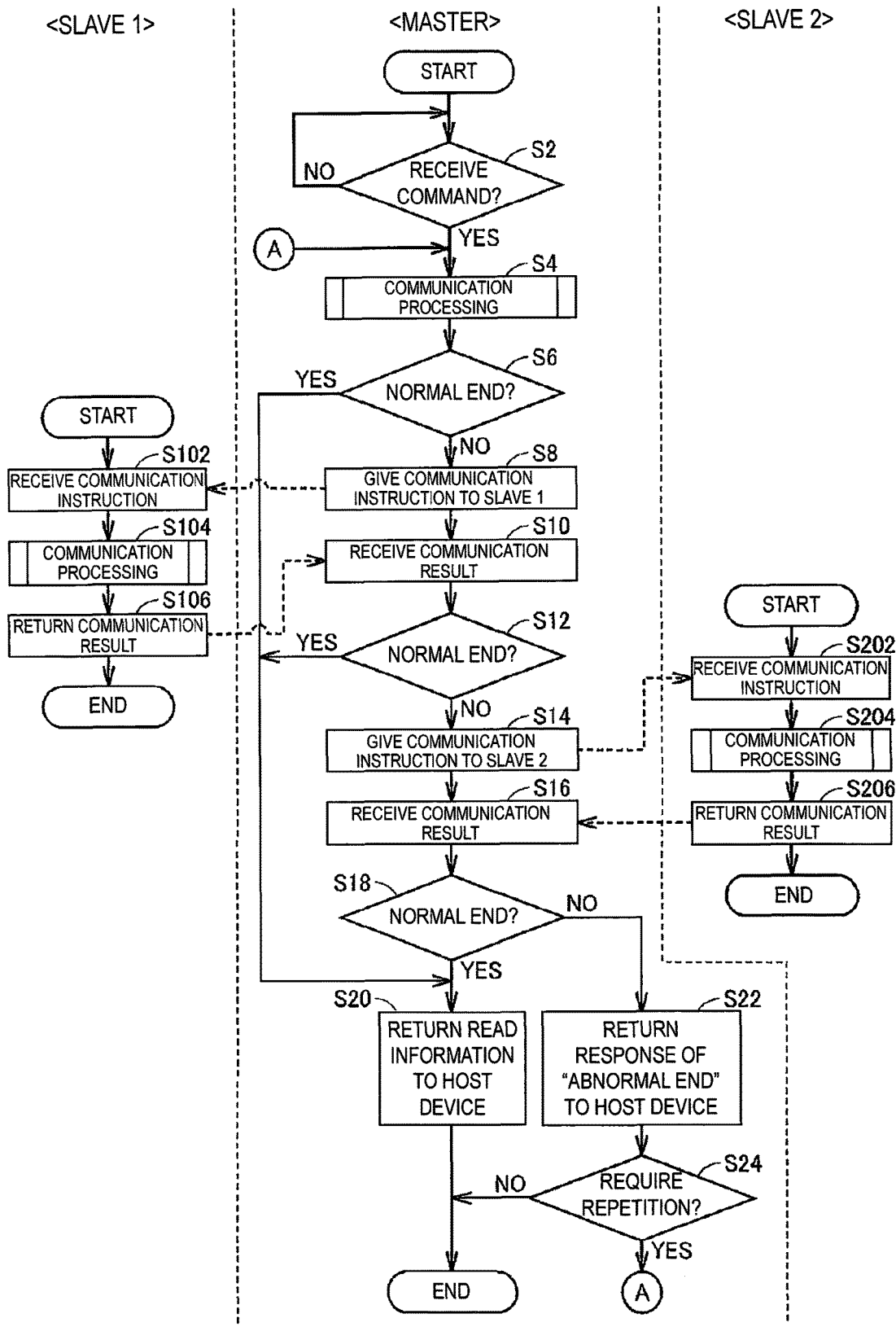
FIG. 5 is a flow chart showing extension communication processing to be executed by the master and the slave in the RFID system according to the first embodiment of the present invention.

FIG. 5 is a flow chart showing extension communication processing to be executed by the master 10 and the slaves 20.1 and 20.2 in the RFID system SYS according to the first embodiment of the present invention. In FIG. 5, the slaves 20.1 and 20.2 are described as a "slave 1" and a "slave 2", respectively.

With reference to FIG. 5, the command receiver 102 of the master 10 stands by until a command is received from the host device 1 (NO in step S (hereinafter abbreviated as "S") 2. If the command is received (YES in S2), the communication processing unit 104 executes communication processing in a once mode (S4). The once mode indicates a mode to be compared with an automatic mode which will be described below, and serves to execute processing for reading tag information from the IC tag 3 without executing processing for detecting the IC tag 3. The communication processing will be described with a subroutine taken as an example in FIG. 6.

Figure 6:
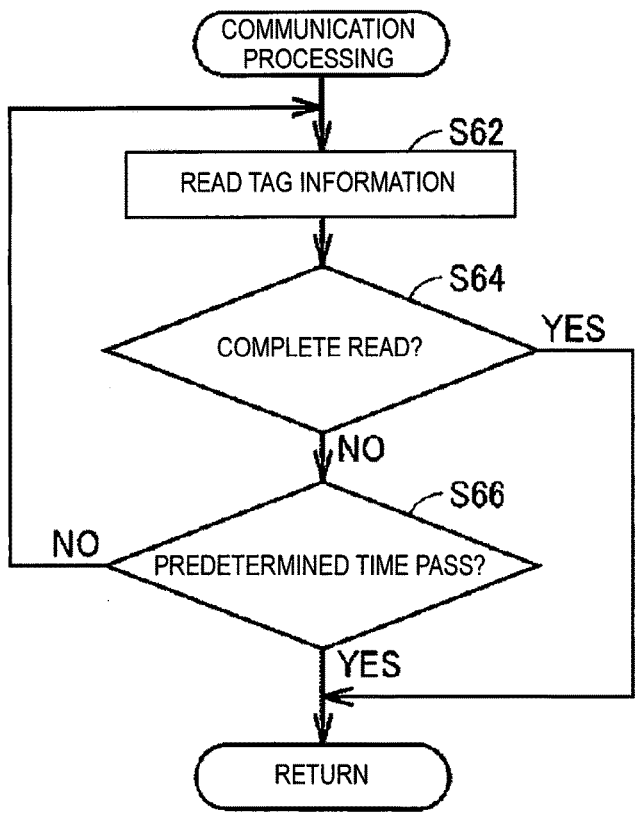
FIG. 6 is a flow chart showing communication processing in a once mode to be executed according to the first embodiment of the present invention.

FIG. 6 is a flow chart showing the communication processing in the once mode to be executed according to the first embodiment of the present invention.

With reference to FIG. 6, the communication processing unit 104 reads tag information from the IC tag 3 (S62). If the reading of the tag information is not completed (NO in S64), it is determined whether a predetermined time passes since the start of the reading or not (S66). If the reading is completed within the predetermined time (YES in S64), a communication result is obtained as "normal end" and the processing returns to the main routine. If the reading is not completed after the predetermined time passes (YES in S66), moreover, the communication result is obtained as "abnormal end" and the processing returns to the main routine.

Although a reading time is limited in the present embodiment, the number of times of retry may be restricted.

With reference to FIG. 5 again, if the communication processing of the communication processing unit 104 is ended, the determining unit 106 determines whether the communication result is the normal end or not (S6). If the communication result is the normal end (YES in S6), the processing proceeds to step S20. On the other hand, if the communication result is the abnormal end (NO in S6), a command of a communication instruction is output to the slave 20.1 (S8). The command may be the same as the command received from the host device 1 by the master 10 in step S2. In other words, a command is transferred from the host device 1 to the slave 20.1 in step S8.

The command receiver 202 of the slave 20.1 receives a communication instruction (S102). Consequently, the communication processing unit 204 executes the communication processing in the once mode shown in FIG. 6 (S104). When the communication processing is ended, the result returning unit 206 of the slave 20.1 returns the communication result to the master 10 (S106).

The result receiver 110 of the master 10 receives a communication result from the slave 20.1 (S10). If the communication result is received, the determining unit 106 determines whether the result is the normal end or not (S12). If the result is the normal end (YES in S12), the processing proceeds to step S20. On the other hand, if the communication result in the slave 20.1 is the abnormal end (NO in S12), a command for a communication instruction is subsequently output to the slave 20.2 (S14). Similarly, a command is transferred from the host device 1 to the slave 20.2.

The command receiver 202 of the slave 2 receives a communication instruction (S202). Consequently, the communication processing unit 204 executes the communication processing in the once mode shown in FIG. 6 (S204). When the communication processing is ended, the result returning unit 206 of the slave 20.2 returns the communication result to the master 10 (S206).

The result receiver 110 of the master 10 receives the communication result from the slave 20.2 (S16). If the communication result is received, the determining unit 106 determines whether the result is the normal end or not (S18). If the result is the normal end (YES in S18), the processing proceeds to step S20. On the other hand, if the communication result in the slave 20.1 is the abnormal end (NO in S18), the processing proceeds to step S22.

In step S20, the response processing unit 112 returns a response of the "normal end" to the host device 1. In this case, information read from the IC tag 3 is returned as response information. The information read from the IC tag 3 represents information read from any of the reader/writers in the master 10, the slave 20.1 and the slave 20.2. In other words, the information read by any of the communication processing in steps S4, S104 and S204 is returned as the response information. The response information is transmitted from the input/output I/F 35 to the transmitter/receiver 100 of the host device 1. If the processing of step S20 is ended, the serial extension communication processing is ended.

In step S22, the response processing unit 112 returns the response of the "abnormal end" to the host device 1. Then, it is determined whether the communication processing is required to be repetitively executed or not (S24). The necessity of the repetition is determined in accordance with an instruction given from the host device 1. If the repetition is required (YES in S24), the processing returns to step S4 and the serial processing is repeated. On the other hand, if the repetition is not required (NO in S24), the extension communication processing is ended.

Although the communication processing is executed in order of the master 10, the slave 20.1 and the slave 20.2 in the present embodiment, the order is not restricted.

As described above, according to the present embodiment, it is possible to reliably read the information of the IC tag 3 by any of the readers/writers (the master 10, the slave 20.1 and the slave 20.2) also in the case where the readers/writers are provided in the positions shown in FIG. 2, the case where the pallet 5 is rotated over the conveyance path 4 or the case where the attachment position of the IC tag 3 varies. As a result, for the host device 1, one of the readers/writers (the master 10) seems to be a communication device having a communication area in a wide range.

The plurality of readers/writers are provided freely in any positions. Therefore, it is preferable to provide the plurality of readers/writers in positions to cover places in which the IC tag might be disposed. For example, in the case where a height of a container for accommodating a workpiece is great, the plurality of readers/writers may be arranged in a longitudinal line. According to the present embodiment, thus, it is possible to freely decide the number of the readers/writers and the installation positions thereof depending on a use environment of the system SYS. Therefore, it is possible to design a communication area desired by a user.

<Second Embodiment>

In the first embodiment, there is employed the structure in which the communication area is extended by the plurality of readers/writers so that the tag information is read/written by one of the plurality of readers/writers. In contrast, an RFID system according to a second embodiment of the present invention is available for high speed movement of a workpiece by extension of an absolute area of a communication area through a plurality of readers/writers.

A difference from the first embodiment will be described below in detail. Since a hardware configuration of the RFID system according to the present embodiment is the same as that in the first embodiment, the designations in FIGS. 1 and 3 will also be used.

(Regarding Example of Installation)

Figure 7:
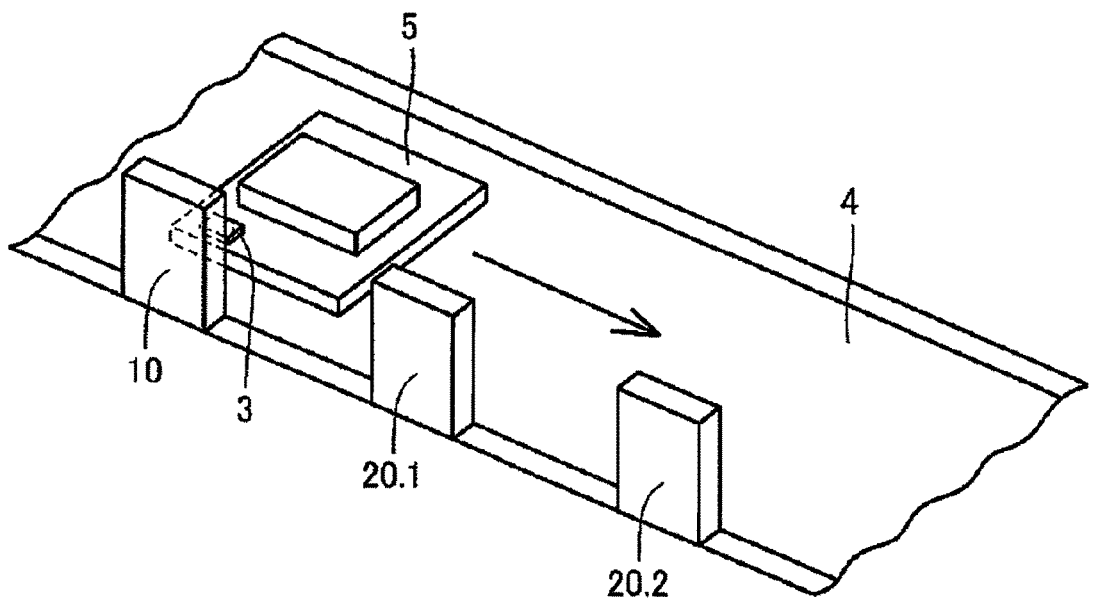
FIG. 7 is a view showing an example of installation of a plurality of readers/writers according to a second embodiment of the present invention.

FIG. 7 is a view showing an example of installation of the plurality of readers/writers according to the second embodiment of the present invention. Also in FIG. 7, for simplicity, a cable for connecting the master 10 and the slaves 20.1 and 20.2 to the hub 2 is not shown.

With reference to FIG. 7, in the present embodiment, the master 10 and the slaves 20.1 and 20.2 are disposed apart from each other in a lateral line in a conveyance direction of the pallet 5. Although order of installation of the master 10 and the slaves 20.1 and 20.2 is optional, the master 10 holds installation order information. More specifically, in the present embodiment, the storage unit 36 of the master 10 stores an IP address of each slave and the installation order information correspondingly. The installation order information also includes information about order of a self device. In other words, in the case of the installation order shown in FIG. 7, it is assumed that the storage unit 36 also stores that the master 10 is firstly arranged (the most upstream side). Consequently, it is possible to control the master 10 to execute communication processing in order from the communication device on the upstream side in the conveyance direction.

(Regarding Functional Structure)

With reference to FIG. 4, in the present embodiment, the functions of the communication processing unit 104, the instruction output unit 108 and the response processing unit 112 which are included in the master 10 and the function of the communication processing unit 204 included in the slave 20 are different from those of the first embodiment.

The communication processing unit 104 included in the master 10 and the communication processing unit 204 included in each of the slaves 20 divide and read/write tag information of the IC tag 3. More specifically, in the case of an operation for reading the tag information, each reader/writer reads only information about an assigned segment (for example, the number of bytes or a class) in the tag information of the IC tag 3. In the case of an operation for writing the tag information, the information about the assigned segment is written to the IC tag 3 in each reader/writer. The segments to be assigned to the respective readers/writers may be perfectly different from each other or may partially overlap with each other. The communication processing units 104 and 204 execute the communication processing in an automatic mode. The automatic mode indicates a mode for executing processing for detecting the IC tag 3 and executing processing for reading the tag information from the IC tag 3 only after detecting the IC tag 3. When the communication processing with the IC tag 3 is ended, generally, a result is returned to the host device 1 to bring a command waiting state.

If the determining unit 106 determines that a communication result in the master 10 is normal end, the instruction output unit 108 outputs a communication instruction to each slave 20 specified by the IP address and the installation position information which are stored in the storage unit 36. The instruction output unit 108 outputs the communication instruction from the slave 20 having an installation position on an upstream side in order.

The response processing unit 112 merges the reading/writing result for a first segment in the master 10 and the reading/writing result for a second segment in the slave 20 (more specifically, reading/writing results for respective segments in the slaves 20.1 and 20.2), and generates response information.

By the functional structure, it is sufficient that each reader/writer reads/writes only information about the assigned segment in order. Therefore, it is possible to read/write the information of the IC tag 3 while moving the pallet 5 at a high speed.

(Regarding Operation)

Figure 8:
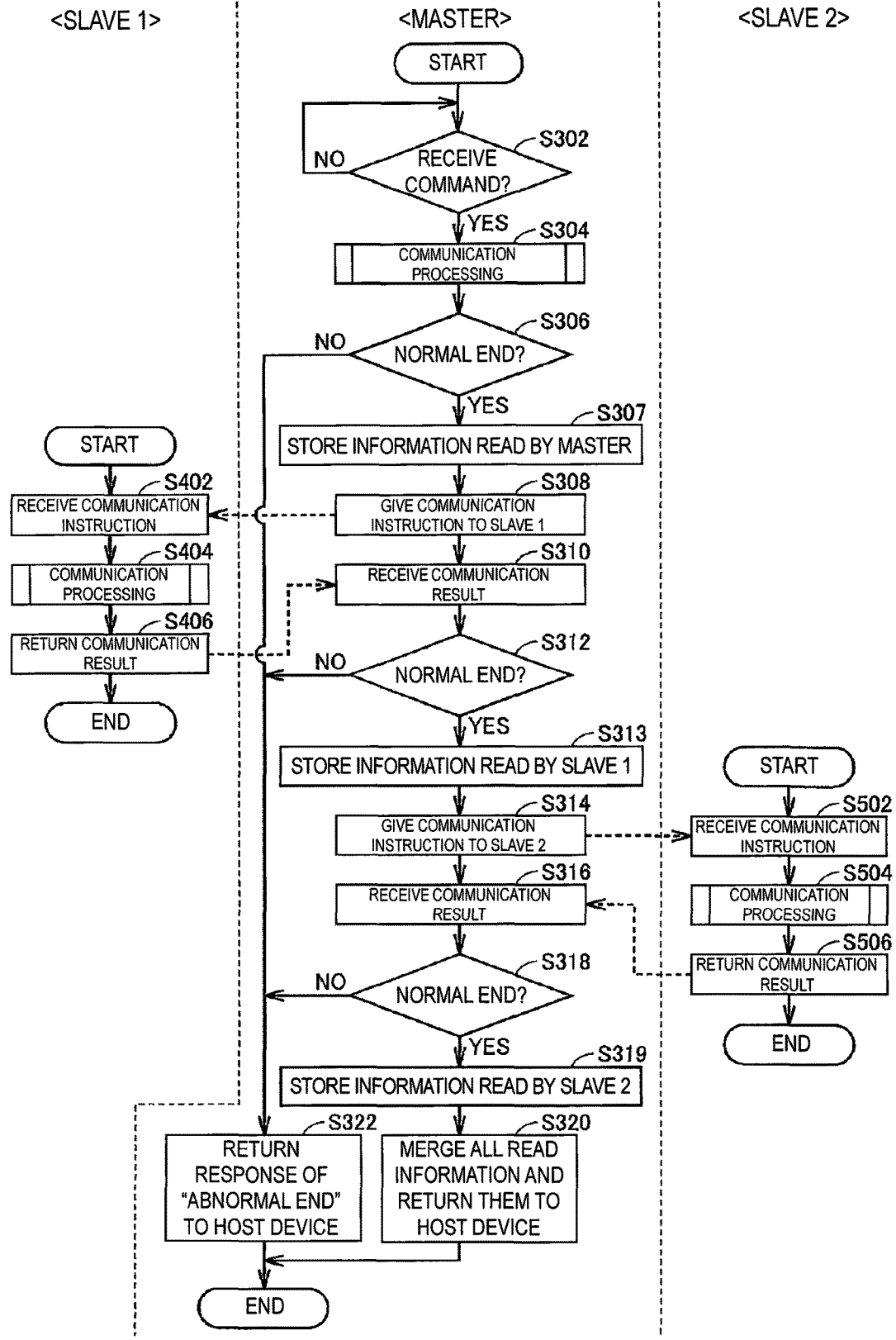
FIG. 8 is a flow chart showing extension communication processing to be executed by a master and a slave in an RFID system according to the second embodiment of the present invention.

FIG. 8 is a flow chart showing extension communication processing to be executed by the master 10 and the slaves 20.1 and 20.2 in the RFID system SYS according to the second embodiment of the present invention. Also in FIG. 8, the slave 20.1 and the slave 20.2 are described as the "slave 1" and the "slave 2", respectively. Similarly, it is assumed that each communication device executes only the reading of the tag information as the reading/writing of the tag information. Moreover, it is assumed that the storage unit 36 of the master 10 stores, as the installation order information, that the self device is firstly arranged, the slave 20.1 is secondly arranged and the slave 20.2 is thirdly arranged.

With reference to FIG. 8, the command receiver 102 of the master 10 stands by until it receives a command from the host device 1 (NO in S302). If the command is received (YES in S302), the communication processing unit 104 executes the communication processing in the automatic mode (S304) because the self device is the communication device on the most upstream side. The communication processing will be described by taking a subroutine as an example in FIG. 9.

Figure 9:
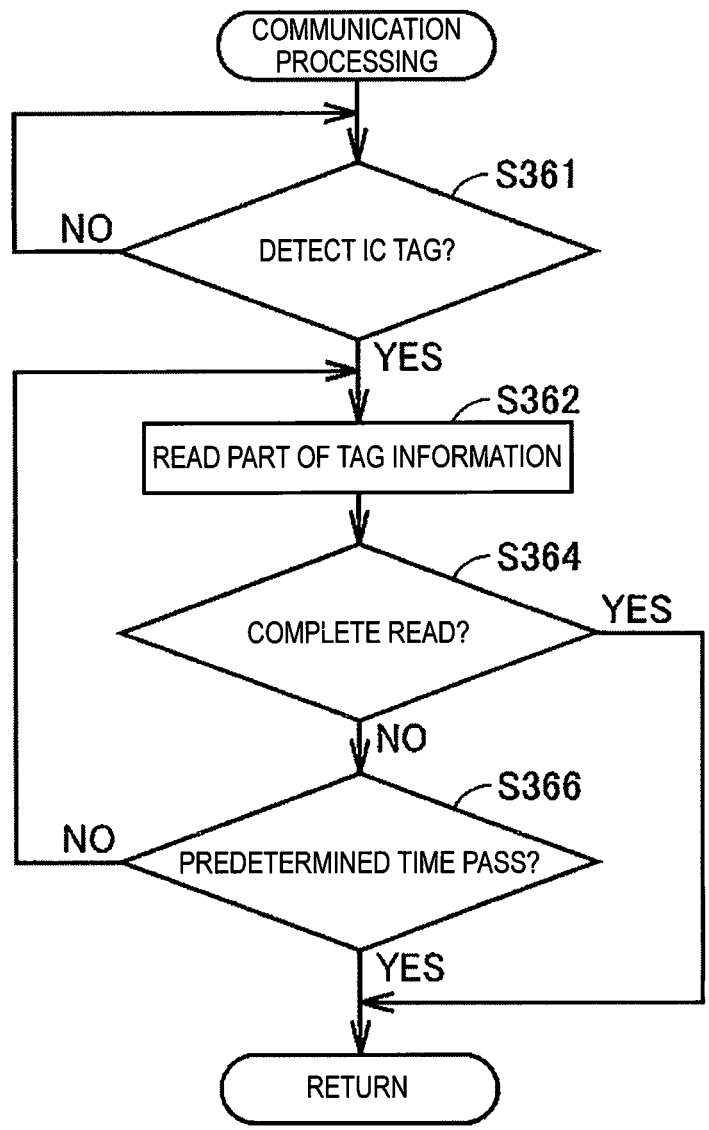
FIG. 9 is a flow chart showing communication processing in an automatic mode to be executed according to the second embodiment of the present invention.

FIG. 9 is a flow chart showing the communication processing in the automatic mode to be executed according to the second embodiment of the present invention.

With reference to FIG. 9, the communication processing unit 104 executes the processing for detecting the IC tag 3 until the IC tag 3 is detected in a self communication area (NO in S361). If the IC tag 3 is detected (YES in S361), processing for reading tag information for an assigned segment from the IC tag 3 is started (S362). In the present embodiment, the information of the IC tag 3 is divided and read by each of three readers/writers. For example, if the tag information is 300-byte information, it is read every 100 bytes in each of the readers/writers. In this case, it is preferable that the master 10 should execute processing for reading information of 1 to 100 bytes, for example.

Each segment may be assigned in the master 10. In this case, for example, a command sent from the host device 1 includes information about all byte numbers in the tag information. The master 10 can assign a segment to be read by each reader/writer based on the all byte numbers and the number of the slaves.

The communication processing unit 104 determines whether or not a predetermined time passes after the reading of the tag information is started (S364). If the reading is completed within the predetermined time (YES in S364), the communication result is set to be "normal end" and the processing returns to the main routine. If the reading is not completed even if the predetermined time passes (YES in S366), moreover, the communication result is set to be "abnormal end" and the processing returns to the main routine.

With reference to FIG. 8 again, if the communication processing of the communication processing unit 104 is ended, the determining unit 106 determines whether the communication result is the normal end or not (S306). If the communication result of the communication processing unit 104 is the abnormal end (NO in S306), the processing proceeds to step S322. On the other hand, if the communication result is the normal end (YES in S306), the communication result in S304, that is, the information read by the master 10 is temporarily stored in an internal memory, for example (S307).

Subsequently, the instruction output unit 108 outputs a command for a communication instruction to the slave 20.1 (S308) because the second communication device is the slave 20.1. The command includes information indicating that the assigned segment has 101 to 200 bytes, for example.

If the command receiver 202 of the slave 20.1 receives the communication instruction (S402), the communication processing in the automatic mode shown in FIG. 9 is executed by the communication processing unit 204 (S404). In the example, processing for reading information of 101 to 200 bytes is executed in the slave 20.1. When the communication processing is ended, the result returning unit 206 of the slave 20.1 returns the communication result to the master 10 (S406).

The result receiver 110 of the master 10 receives the communication result from the slave 20.1 (S310). When the communication result is received, the determining unit 106 determines whether the result is the normal end or not (S312). If the communication result in the slave 20.1 is the abnormal end (NO in S312), the processing proceeds to step S322. On the other hand, if the communication result is the normal end (YES in S312), the received communication result, that is, the information read by the slave 20.1 is temporarily stored in the internal memory, for example (S313).

Subsequently, the instruction output unit 108 outputs a command for a communication instruction to the slave 20.2 (S314) because the third communication device is the slave 20.2. The command includes information indicating that the assigned segment has 201 to 300 bytes, for example.

If the command receiver 202 of the slave 20.2 receives the communication instruction (S502), the communication processing in the automatic mode shown in FIG. 9 is executed by the communication processing unit 204 (S504). In the example, processing for reading information of 201 to 300 bytes is executed in the slave 20.2. When the communication processing is ended, the result returning unit 206 of the slave 20.2 returns the communication result to the master 10 (S506).

The result receiver 110 of the master 10 receives the communication result from the slave 20.2 (S316). When the communication result is received, the determining unit 106 determines whether the result is the normal end or not (S318). If the communication result in the slave 20.2 is the abnormal end (NO in S318), the processing proceeds to step S322. On the other hand, if the communication result is the normal end (YES in S318), the received communication result, that is, the information read by the slave 20.2 is temporarily stored in the internal memory, for example (S319).

When the information about the assigned segments are read by all of the readers/writers respectively, thus, the response processing unit 112 of the master 10 returns the response of the "normal end" to the host device 1. In this case, the response processing unit 112 merges all of the read information and returns the merged information to the host device 1 (S320). All of the read information indicate information stored in the internal memory and read by all of the readers/writers. In other words, the information read by the communication processing executed in steps S304, S404 and S504 through the master 10 and the slaves 20.1 and 20.2 are merged and the merged information are returned as response information to the host device 1. The response information is transmitted from the input/output I/F 35 to the transmitter/receiver 100 of the host device 1. When the processing of step S20 is ended, the serial extension communication processing is ended.

In step S322, the response processing unit 112 returns the response of the "abnormal end" to the host device 1 so that the extension communication processing is ended.

As described above, in the present embodiment, the information of the IC tag 3 is divided and read/written in order from the upstream side by the plurality of readers/writers. Accordingly, it is possible to read/write the information of the IC tag 3 without stopping the pallet 5 on the conveyance path 4. As a result, it is possible to shorten the reading/writing processing for the IC tag 3 in each step in a production line.

<Third Embodiment>

In the second embodiment, the tag information is divided and read/written to be compatible with the high speed movement of the workpiece. By dividing and reading/writing the tag information, however, it is also possible to read/write the tag information having a large capacity. The system will be described as a third embodiment of the present invention.

A difference from the second embodiment will be described below in detail. Since a hardware configuration of an RFID system according to the present embodiment is also the same as the first and second embodiments, the designations in FIGS. 1 and 3 will also be used. In the present embodiment, the plurality of readers/writers may be provided adjacently, for example, in a longitudinal line, a lateral line, or the like.

(Regarding Functional Structure)

With reference to FIG. 4, in the present embodiment, the functions of the communication processing unit 104 included in the master 10 and the communication processing unit 204 included in the slave 20 are mainly different from those in the second embodiment.

Also in the present embodiment, the communication processing units 104 and 204 read/write tag information in an automatic mode in the same manner as in the second embodiment. In the present embodiment, it is sufficient that tag information having a large capacity is only read/written. As in the second embodiment, it is not necessary to read/write information of an IC tag in accordance with installation order of the plurality of readers/writers as in the second embodiment. Accordingly, it is also supposed that processing for detecting a tag is performed at the same time by each of the readers/writers. As a result, however, mutual interference occurs between the plurality of readers/writers in some cases. In order to reduce the influence of the mutual interference, therefore, it is desirable that these should not be oscillated at the same time. In the present embodiment, therefore, there is employed the structure in which a master controls the readers/writers to cause no simultaneous oscillation also in the case where communication processing is executed in an automatic mode.

(Regarding Operation)

Figure 10:
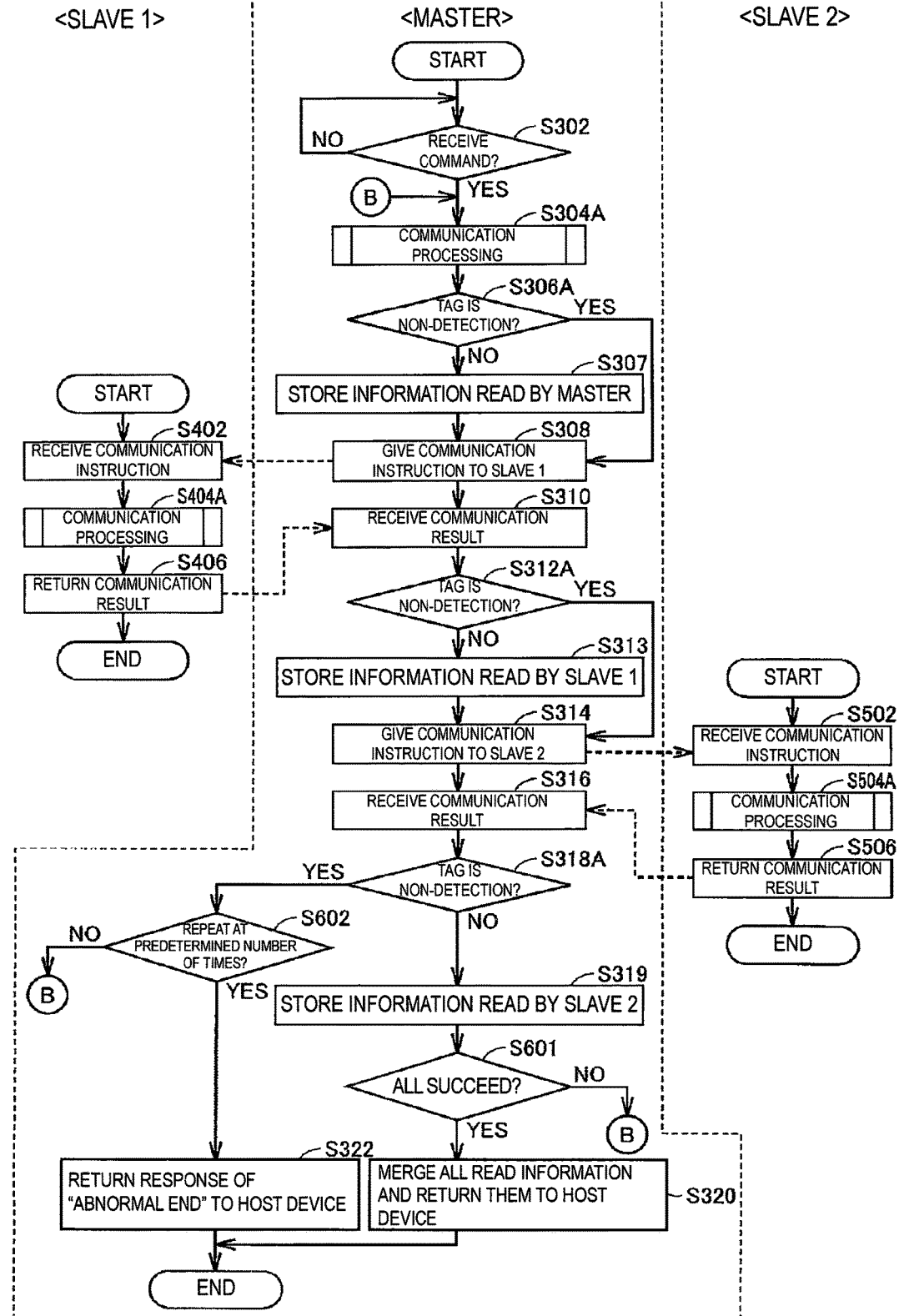
FIG. 10 is a flow chart showing extension communication processing to be executed by a master and a slave in an RFID system according to a third embodiment of the present invention.

FIG. 10 is a flow chart showing extension communication processing to be executed by the master 10 and slaves 20.1 and 20.2 in an RFID system SYS according to the third embodiment of the present invention. Similarly, it is assumed that only reading of tag information is executed as reading/writing of tag information by each communication device. In FIG. 10, the same processing as that shown in FIG. 8 has the same step number. Therefore, their description will not be repeated.

Figure 11:
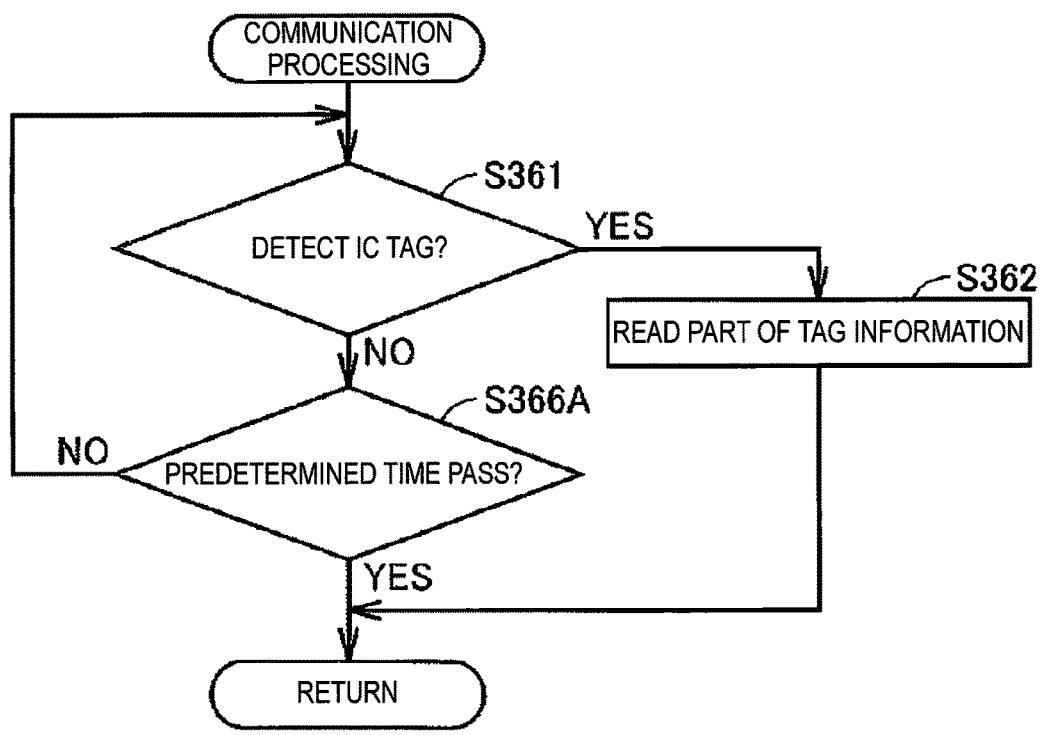
FIG. 11 is a flow chart showing communication processing in an automatic mode to be executed according to the third embodiment of the present invention.

With reference to FIG. 10, communication processing (S304A, S404A and S504A) to be executed in each of the readers/writers is different in the present embodiment. FIG. 11 shows a flow of the communication processing according to the present embodiment.

FIG. 11 is a flow chart showing the communication processing in the automatic mode to be executed according to the third embodiment of the present invention.

With reference to FIG. 11, the communication processing unit 104 executes processing for detecting the IC tag 3 in the same manner as in the second embodiment (S361). In the present embodiment, a duration for the detection processing is limited. For this reason, if the IC tag 3 is not detected even though a predetermined time passes (YES in S366A), a determination of "tag non-detection" is made and the processing returns to the main routine. If the IC tag 3 is detected within a predetermined time (YES in S361), a part of tag information is read (S362) in the same manner as in the second embodiment. In other words, it is preferable that the master 10 and the slaves 20.1 and 20.2 each should execute processing for reading the tag information every 100 bytes, for example. When the reading is completed, a determination of "normal end" is made and the processing returns to the main routine.

Also in the present embodiment, if the read processing is not completed within a predetermined time (which is different from the "predetermined time" in the S366A and corresponds to the "predetermined time" in the S366 of FIG. 9), a determination of "abnormal end" may be made and the processing returns to the main routine in the same manner as in the second embodiment.

With reference to FIG. 10 again, when the communication processing is ended, a determining unit 106A determines whether the tag is non-detection or not (S306A). If the IC tag 3 is not the non-detection, that is, the determination of the normal end is made (NO in S306A), the processing proceeds to S307 in which information read by the master 10 is stored. On the other hand, if the IC tag 3 is the non-detection (YES in S306A), the processing skips to step S308 in which a communication instruction is immediately output to the slave 20.1.

Also in step S312A after the end of the communication processing in the slave 20.1, the same processing as that described above is performed. In other words, if the IC tag 3 is not the non-detection, that is, the determination of the normal end is made (NO in S312A), the processing proceeds to step S313 in which information read by the slave 20.1 is stored. On the other hand, if the IC tag 3 is the non-detection (YES in S312A), the processing skips to step S314 in which a communication instruction is immediately output to the slave 20.2.

If the IC tag 3 is not the non-detection in step S318A after the end of the communication processing in the slave 20.2, that is, the determination of the normal end is made (NO in S318A), the processing proceeds to step S319 in which information read by the slave 20.2 is stored. Then, if it is determined that all of the reading operations are successful (YES in S601), the processing proceeds to S320 in which a response processing unit 112 merges all of the read information and returns the merged information to a host device 1. If all of the reading operations are not successful, that is, the tag is not detected by any of readers/writers (NO in S601), the processing returns to step S304A and the serial processing is repeated.

On the other hand, if the communication result in the slave 20.2 is the tag non-detection (YES in S318A), it is determined whether the serial communication processing is repeated at a predetermined number of times or not (S602). If the processing is repeated at a smaller number of times than the predetermined number of times (NO in S602), the processing returns to step S304A and the serial processing is repeated. If the processing is repeated at the predetermined number of times (YES in S602), the processing proceeds to step S322 in which a response of the "abnormal end" is returned to the host device 1.

After the second processing, it is also possible to execute the communication processing by only any of the readers/writers which do not complete the reading.

According to the present embodiment, it is possible to reliably read tag information having a large capacity by regulating the number of the slaves 20 depending on the capacity of the tag information.

Figure 12:
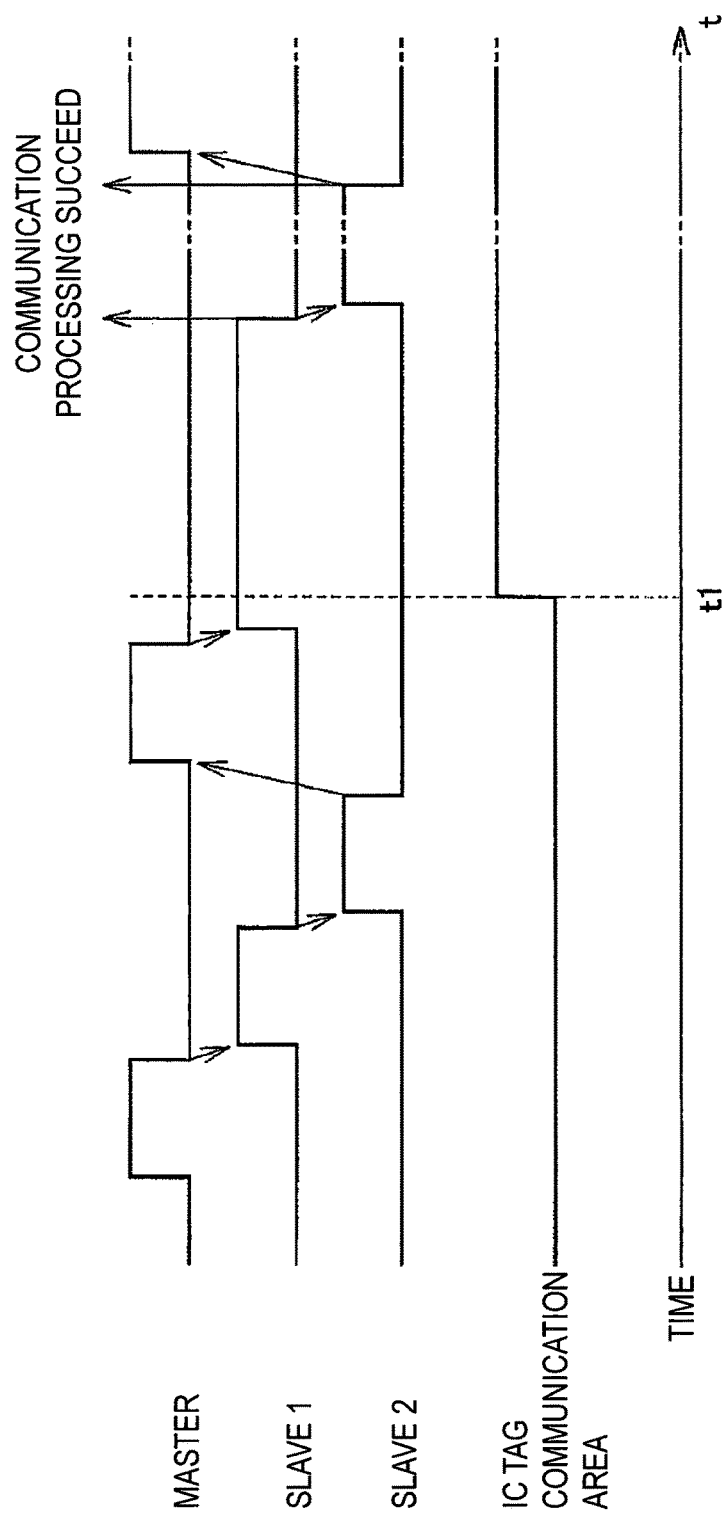
FIG. 12 is a timing chart showing communication timing of a plurality of readers/writers according to the third embodiment of the present invention.

FIG. 12 is a timing chart showing communication timing of the plurality of readers/writers according to the third embodiment of the present invention.

With reference to FIG. 12, first of all, the master 10 turns ON the communication processing in the self device, for example. If the IC tag 3 is not detected within a predetermined time in the master 10, the communication processing in the self device is turned OFF and the communication processing of the slave 20.1 (the "slave 1" in FIG. 12) is turned ON. If the IC tag 3 is not detected within the predetermined time in the slave 20.1, similarly, the communication processing in the slave 20.1 is turned OFF and the communication processing in the slave 20.2 (the "slave 2" in FIG. 12) is turned ON. If the IC tag 3 is not detected within the predetermined time in the slave 20.2, the communication processing in the slave 20.2 is turned OFF and the communication processing in the master 10 is turned ON again.

The processing is repeated at a predetermined number of times, for example (S602 in FIG. 11). When the IC tag 3 enters a communication area of each of the readers/writers after a time t1, for example, processing for reading a part of tag information is started in the slave 20.1 performing the communication processing at that time. When the reading of the tag information is completed, a notice of communication processing success (normal end) is given to the master 10 and the read information is returned. When the master 10 turns ON the communication processing of the slave 20.2, subsequently, the reading of a part of the tag information is executed in the slave 20.2. Also in this case, when the reading of the tag information is completed, the notice of the communication processing success (normal end) is given to the master 10 and the read information is returned.

In the present embodiment, if the IC tag 3 is not detected within the predetermined time in each slave 20, information indicative of the non-detection of the IC tag 3 is given as a notice to the master 10. However, the present invention is not restricted to this example but information indicative of the tag detection success is given as a notice to the master 10 if the IC tag 3 is detected within the predetermined time in the slave 20. In this case, if the information indicative of the tag detection success is not given as the notice from the slave 20 within a constant time, the master 10 can know that the IC tag 3 is not detected in the slave 20 outputting a communication instruction.

<First Variant>

As described above, the first embodiment employs the structure which is compatible with the variation or change in the position of the IC tag and the second embodiment employs the structure which is compatible with the high speed movement of the IC tag (workpiece). Moreover, the third embodiment employs the structure which is compatible with the tag information having a large capacity. The description has been given on the assumption that the communication processing is executed in the once mode in the first embodiment and the communication processing is executed in the automatic mode in the second and third embodiments. However, the mode in each of the embodiments is only illustrative and the once mode and the automatic mode may be replaced with each other.

In the case of the once mode, the communication processing in the slave 20 is performed with a shift. However, the execution is restrictive but the communication processing in the plurality of slaves 20 may be performed simultaneously. In this case, the instruction output unit 108 of the master 10 may output a communication instruction to two slaves 20 or more at the same time. The communication instruction may be commands having the same contents.

In the case where the communication processing according to the first embodiment is executed in the automatic mode, it is preferable to limit the duration for the tag detection processing as in the communication processing shown in FIG. 11 according to the third embodiment.

In the case where the communication processing according to the second embodiment is executed in the once mode, it is preferable to execute the communication processing shown in FIG. 6 according to the first embodiment until the reading/writing succeeds in each of the readers/writers. In this case, the "predetermined time" in step S66 of FIG. 6 may be longer than the "predetermined time" according to the first embodiment.

In the case where the communication processing according to the third embodiment is executed in the once mode, it is preferable to execute the communication processing shown in FIG. 6 according to the first embodiment.

<Second Variant>

Moreover, the first to third embodiments may be appropriately combined.

For example, in the case where the program corresponding to the first embodiment and the program corresponding to the third embodiment are stored in the storage unit 36 of the master 10, the master 10 may execute one of the programs depending on a type of a command sent from the host device 1. It is preferable that the program corresponding to the first embodiment should be executed in the case where the type of the command is a "wide area read command", and the program corresponding to the third embodiment should be executed in the case where the type of the command is a "large capacity read command".

<Third Variant>

Although the description has been given with the function of the communication device divided perfectly by the master and the slave in each of the embodiments, alternatively, the system may include a communication device having both of the functions. In other words, the communication device may be operated in a first mode for the function of the master or a second mode for the function of the slave. In that case, the storage unit 36 of the communication device stores a program for functioning as the master 10 and a program for functioning as the slave 20. Moreover, the communication device includes a setting unit (not shown) for setting an operation mode.

The setting unit may be a DIP switch or a rotary switch, for example. In this case, in the setting unit, a mode is switched depending on an operation signal sent from an operation unit (not shown) provided in the device, for example.

Alternatively, the setting unit may be a predetermined storage area for storing a set value indicative of an operation mode. The storage area is included in a readable/writable memory from an outside of the communication device. The memory may be the storage unit 36 or another recording medium.

It is also possible to offer, as a program (a communication program), the processing of each communication device corresponding to each of the embodiments and each of the variants. It is possible to offer the program that is recorded on an optical medium such as a CD-ROM or a computer readable non-transitory recording medium such as a memory card. Moreover, it is also possible to offer a program by download through a network.

The communication device can acquire the program from the host device 1 through the input/output I/F 35, for example. Moreover, the communication device can acquire the program recorded on the computer readable recording medium by the reading using a drive device which is not shown. When acquiring the program, the communication device can also update the program stored in the storage unit 36.

It should be understood that the embodiments disclosed above are exemplary only and not restrictive in any way. The scope of the present invention is indicated not by the above description but by the claims, and all the modifications equivalent in meaning to and within the claims are intended to be included.

What is claimed is:

1. A communication device configured to perform non-contact communication with an IC tag, the communication device comprising:
   in a condition in which the communication device is configured as a master communication device, a command receiver that receives a command from a host control device that provides exclusive control over reading and writing of information from or to the IC tag, the host control device communicating only with the master communication device;
   a first communication processing unit that communicates with the IC tag in order to one of: read and write the information from and to the IC tag based on the command received by the command receiver of the master communication device;
   an instruction output unit that outputs a communication instruction to another communication device configured as a slave communicaetion device in case where the first communication processing unit of the master communication device fails to one of read and write the information from and to the IC tag, the slave communication device being other than the IC tag, the communication instruction instructing the slave communication device to execute communication processing with the IC tag; and
   a response processing unit that generates response information to the command received from the host control device: (i) in a case where one of reading and writing of the tag information through the first communication processing unit of the master communication device succeeds, based on a first communication result of the one of reading and writing of the tag information through the first communication processing unit of the master communication device; and (ii) in a case where one of reading and writing of the tag information through the first communication processing unit of the master communication device fails, based on a second communication result of one of reading and writing of the tag information through the slave communication device responsive to the communication instruction output by the instruction output unit of the master communication device.

2. The communication device according to claim 1, wherein the slave communication device comprises a second communication processing unit that communicates with the IC tag in order to one of: read and write the tag information of the IC tag based on the communication instruction, and a result returning unit that returns, as the second communication result, a processing result obtained by the second communication processing unit,
   the communication device further comprising a result receiver that receives the second communication result from the result returning unit.

3. The communication device according to claim 2, wherein
the response processing unit generates the response information based on only the first communication result in a case where the one of: reading and writing of the tag information through the first communication processing unit succeeds.

4. The communication device according to claim 3, wherein the response processing unit generates the response information based on only the second communication result in a case where the one of: reading and writing of the tag information through the second communication processing unit succeeds.

5. The communication device according to claim 2, wherein the first communication processing unit one of: reads and writes information in a first segment of the tag information,
the instruction output unit outputs the communication instruction to the slave communication device so as to one of: read and write information in a second segment of the tag information, and
the response processing unit merges the information in the first segment and the information in the second segment to generate the response information.

6. The communication device according to claim 5, wherein the first communication processing unit and the second communication processing unit execute detection processing for detecting presence of the IC tag, and
in a case where the presence of the IC tag is detected, the first communication processing unit and the second communication processing unit one of: read and write the information in the first segment and the information in the second segment, respectively.

7. The communication device according to claim 5, wherein the instruction output unit outputs the communication instruction to the slave communication device in a case where the information in the first segment is one of:
read and written by the first communication processing unit.

8. The communication device according to claim 2, wherein the slave communication device comprises a plurality of slave devices each comprising the second communication processing unit and the result returning unit, and
the instruction output unit outputs the communication instruction to at least one of the plurality of slave devices in response to the first communication result obtained by the first communication processing unit.

9. The communication device according to claim 8, further comprising:
a storage unit configured to store IP addresses and installation position information of the plurality of slave devices,
wherein the instruction output unit outputs the communication instruction to each of the slave devices specified by the IP addresses and the installation position information.

10. The communication device according to claim 8, wherein the communication device is connected to the host control device and each of the plurality of slave devices through a line concentrator and communicates with the host control device and the plurality of slave devices via the line concentrator.

11. The communication device according to claim 1, further comprising a setting unit that sets an operation mode, wherein the operation mode has a first mode for functioning as the communication device and a second mode for functioning as the slave communication device, and
the communication device is operated based on the operation mode set to the setting unit.

12. An RFID system comprising:
an IC tag;
a host control device that provides exclusive control over reading and writing of information from or to the IC tag; and
first and second communication devices connected to the host control device, the first and second communication devices performing non-contact communication with the IC tag, the host control device communicating only with the first communication device in a condition in which the first device is configured as a master communication device,
wherein the host control device comprises a transmitter that transmits a command to the first communication device,
the first communication device comprises:
a command receiver that receives the command from the host control device;
a first communication processing unit that communicates with the IC tag in order to one of: read and write tag information of the IC tag based on the command received by the command receiver;
an instruction output unit configured to output a communication instruction to the second communication device configured as a slave communication device to instruct the slave communication device to execute communication processing with the IC tag, in a case where the first communication processing unit fails to one of; read and write the information from and to the IC tag; and
a response processing unit that generates response information to the host control device: (i) in a case where the one of reading and writing of the tag information through the first communication processing unit of the master communication device succeeds, based on a first communication result of the one of reading and writing of the tag information through the first communication processing unit of the master communication device; and (ii) in a case where the one of: reading and writing of the tag information through the first communication processing unit of the master communication device fails, based on a second communication result of one of reading and writing of the tag information through the slave communication device responsive to the communication instruction, and
the host control device further comprises a receiver that receives the response information generated by the response processing unit of the first communication device.

13. A non-transitory computer-readable medium storing computer executable instructions that when executed by a computer of a master communication device, cause the computer to perform operations for non-contact communication with an IC tag, the operations comprising:
receiving by the master communication device a command from a host control device that provides exclusive control over reading and writing of information from or to the IC tag, the host control device communicating only with the master communication device;

communicating with the IC tag in order to one of: read and write tag information of the IC tag based on the received command;
outputting a communication instruction to a slave communication device to instruct the slave communication device to execute communicating with the IC tag, in a case where the communicating in order to one of: read and write the information from and to the IC tag by the master communication device fails; and
generating response information to the host control device: (i) in a case where one of reading and writing of the tag information by the master communication device succeeds, based on a first communication result of one of reading and writing of the tag information by the master communication device; and (ii) in a case where the one of: reading and writing of the tag information by the master communication device fails, based on a second communication result of one of reading and writing of the tag information by the slave communication device relative to the communication instruction.

14. The communication device according to claim 3, wherein
the response processing unit generates the response information based on only the first communication result in a case where the one of: reading and writing of the tag information through the first communication processing unit is completed within a predetermined time.

* * * * *